(12) United States Patent
Qiu et al.

(10) Patent No.: US 10,387,302 B2
(45) Date of Patent: Aug. 20, 2019

(54) MANAGING DATABASE INDEX BY LEVERAGING KEY-VALUE SOLID STATE DEVICE

(71) Applicant: Samsung Electronics Co., Ltd., Suwon-si, Gyeonggi-do (KR)

(72) Inventors: Sheng Qiu, San Jose, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 458 days.

(21) Appl. No.: 15/194,515

(22) Filed: Jun. 27, 2016

(65) Prior Publication Data

US 2017/0300407 A1    Oct. 19, 2017

Related U.S. Application Data

(60) Provisional application No. 62/324,338, filed on Apr. 18, 2016.

(51) Int. Cl.
*G06F 16/00* (2019.01)
*G06F 12/02* (2006.01)
*G06F 3/06* (2006.01)

(52) U.S. Cl.
CPC ........ *G06F 12/0238* (2013.01); *G06F 3/0604* (2013.01); *G06F 3/0653* (2013.01); *G06F 3/0679* (2013.01); *G06F 12/0253* (2013.01); *G06F 2212/251* (2013.01); *G06F 2212/702* (2013.01)

(58) Field of Classification Search
CPC .................................................. G06F 12/0238
See application file for complete search history.

(56) References Cited

U.S. PATENT DOCUMENTS

| 8,499,121 | B2 | 7/2013 | Tolia et al. |
| 8,626,717 | B2 | 1/2014 | Bendakovsky et al. |
| 2012/0072656 | A1 | 3/2012 | Archak et al. |
| 2016/0055191 | A1 | 2/2016 | Joshi et al. |
| 2017/0242799 | A1* | 8/2017 | O'Krafka ................ G06F 12/10 |
| 2018/0012033 | A1* | 1/2018 | Nakajima ............. G06F 21/602 |

* cited by examiner

*Primary Examiner* — Cheryl Lewis
(74) *Attorney, Agent, or Firm* — Renaissance IP Law Group LLP

(57) ABSTRACT

According to one general aspect, an apparatus may include a host interface layer, a translation data structure, and a non-volatile memory. The host interface layer may be configured to receive a multi-association command that associates two or more keys with a common value. The translation data structure may be configured to: maintain a key-value index that represents a plurality of key-value descriptors stored within a non-volatile memory, and associate the two or more keys with the common value. The non-volatile memory configured to store a plurality of key-value descriptors each including a respective value and at least one respective key, wherein at least one key-value descriptor includes a plurality of keys, wherein each of the plurality of keys are associated with the common value, and wherein the at least one key-value descriptor further includes either the common value or a pointer to the common value.

20 Claims, 6 Drawing Sheets

FIG. 2

| 212 OpCode | 116-1 1ST KEY | 116-2 2ND KEY | 118 VALUE | } 202 |

| 213 OpCode | 116-1 1ST KEY | 116-2 2ND KEY | 236-2 2ND KEY PERMISSION | 118 VALUE | } 203 |

| 214 OpCode | 240 NUMBER OF KEYS | 116-1 1ST KEY | ... | 116-N NTH KEY | 118 VALUE | } 204 |

| 215 OpCode | 116 KEY | 118 VALUE | 225 DISASSOC | } 205 |

| 216 OpCode | 116 KEY | } 206 |

| 217 OpCode | 116 KEY | 227 ALL KEYS | } 207 |

MANAGING DATABASE INDEX BY LEVERAGING KEY-VALUE SOLID STATE DEVICE

CROSS-REFERENCE TO RELATED APPLICATION

This application claims priority under 35 U.S.C. § 119 to Provisional Patent Application Ser. No. 62/324,338, entitled "METHOD OF MANAGING DATABASE INDEX BY LEVERAGING KEY-VALUE SSD" filed on Apr. 18, 2016. The subject matter of this earlier filed application is hereby incorporated by reference.

TECHNICAL FIELD

This description relates to the storage of key value pairs, and more particularly, to a system and method for storing multiple keys that are associated with a common value.

BACKGROUND

An associative array, map, symbol table, or dictionary is an abstract data type that generally includes a collection of key-value pairs, such that each possible key appears just once in the collection. A key value store is a type of computer database that can be used in data-intensive, high-performance, scale-out computing environments. Key value stores allow computer applications to store schema-less data. Schema-less data can include structures having a string that represents the key and the actual data that is considered the value in a "key-value" relationship. Such key-value structures replace the need for fixed data models and also allow for proper formatting.

Traditionally key value stores consider a flash memory device or a solid state disk/drive (SDD) as a block device. Thus, a key value store maintains its own mapping or index which, in many cases, can be redundant to mappings maintained by a Flash Translation Layer (FTL) of the flash memory or SDD. Conventionally, the mapping maintained in the system memory by the key value store includes the actual key. This is needed to check for hash collisions and key over-write scenarios. Often keeping all of the keys in memory requires significant memory. In one example, the key value index may include a hash of the keys that is efficiently traversable or searchable. A key value index may be stored in binary search tree or in a data structure specialized to a particular type of keys.

While key value stores traditionally make use of strings as keys any data form is possible. The general limitation of key values stores is that the relationship between keys and values be one-to-one. That is to say that each key is associated with one and only one value, and each value is associated with one and only one key.

SUMMARY

According to one general aspect, an apparatus may include a host interface layer, a translation layer or data structure, and a non-volatile memory. The host interface layer may be configured to receive a multi-association command that associates two or more keys with a common value. The translation data structure may be configured to: maintain a key-value index that represents a plurality of key-value descriptors stored within a non-volatile memory, and in response to the multi-association command, associate the two or more keys with the common value. The non-volatile memory configured to store a plurality of key-value descriptors each including a respective value and at least one respective key, wherein at least one key-value descriptor includes a plurality of keys, wherein each of the plurality of keys are associated with the common value, and wherein the at least one key-value descriptor further includes either the common value or a pointer to the common value.

According to another general aspect, a method may include receiving, by a host interface, a multi-association command that associates a common value with a second of two or more keys. The method may include associating in a key-value index the two or more keys with the common value, wherein the key-value index is maintained by a non-volatile memory device, and represents a plurality of key-value descriptors stored within the non-volatile memory device. The method may also include storing, in the non-volatile memory device, a key-value descriptor that includes the two or more keys and either the common value or a pointer to the common value, wherein the key-value descriptor is stored amongst the plurality of key-value descriptors.

According to another general aspect, a system may include a processor and a non-volatile memory device. The processor may be configured to transmit, to a non-volatile memory device, a multi-association command to that associates two or more keys with a common value. The non-volatile memory device may be configured to: maintain a key-value index that represents a plurality of key-value descriptors stored within the non-volatile memory device, in response to the multi-association command, associate the two or more keys with the common value, andstore, in the non-volatile memory device, a key-value descriptor that includes the two or more keys and either the common value or a pointer to the common value, wherein the key-value descriptor is stored amongst the plurality of key-value descriptors.

The details of one or more implementations are set forth in the accompanying drawings and the description below. Other features will be apparent from the description and drawings, and from the claims.

A system and/or method for to the storage of key value pairs, and more particularly, to a system and method for storing multiple keys that are associated with a common value, substantially as shown in and/or described in connection with at least one of the figures, as set forth more completely in the claims.

BRIEF DESCRIPTION OF THE DRAWINGS

FIG. 2 is a block diagram of example embodiments of various data structures in accordance with the disclosed subject matter.

DETAILED DESCRIPTION

Figure 1:
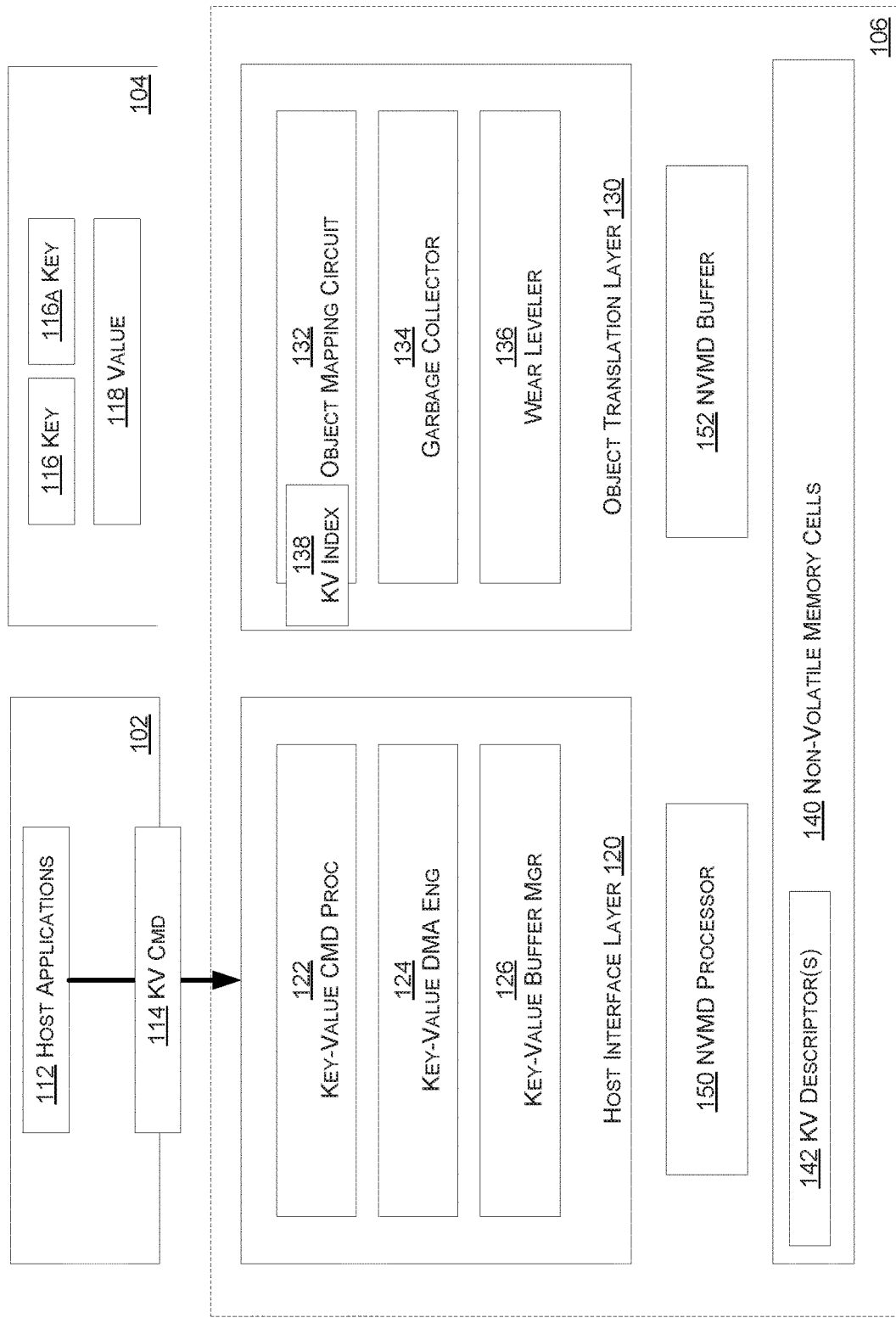
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include a computing device, such as, for example, a laptop, desktop, workstation, personal digital assistant, smartphone, tablet, and other appropriate computers, and so on or a virtual machine or virtual computing device thereof.

In one embodiment, the system 100 may include a processor 102 configured to execute instructions, and more specifically in this case issue memory access commands (e.g., read, write, etc.). In the illustrated embodiment, the processor 102 may execute one or more host applications 112 or software programs. In such an embodiment, the host applications 112 may access the data described herein. Specifically, in the illustrated embodiment, the host application 112 or processor 102 may transmit a key-value (KV) command 114 to the non-volatile memory device (NVMD) 106.

In the illustrated embodiment, the system 100 may include a non-volatile memory device (NVMD) 106, such as, for example, a flash drive, a solid state drive (SSD), etc.; although, it is understood that the above are merely a few illustrative examples to which the disclosed subject matter is not limited. The NVMD 106 may store a database or plurality of key-value (KV) data structures or descriptors 142. As described above, the KV descriptors 142 may include pairs of data that are traditionally associated with one another in a one-to-one relationship, wherein one part of the pair is referred to as the key and the other part the value. As described herein, some or all of the KV descriptors 142 may not be simple, traditional pairs of data but may include a plurality of keys all associated with a common value.

For the time being and for purposes of illustration, let us say the KV descriptors 142 stored by the NVMD 106 are of the traditional key-value pair variety. The host application 112 or processor 102 may access the KV descriptors 142 via a traditional access paradigm. The KV descriptors 142 may be written to, read from, or deleted as desired. The system 100 may be configured to support such access. However, in the illustrated embodiment, the system 100 may also be configured to also support a non-traditional form of access in which multiple keys are associated with a single value.

In such an embodiment, the host application 112 or processor 102 may transmit a multi-association command 114 to the NVMD 106. Such a multi-association command 114 may indicate that the processor 102 wishes to associate two or more keys (e.g., keys 116 and 116a) with a single, common value.

In various embodiments, the system 100 may include a system memory 104. In such an embodiment, the system memory 104 may include a volatile memory, such as, dynamic random access memory (DRAM) configured to temporarily store data; although, it is understood that the above are merely a few illustrative examples to which the disclosed subject matter is not limited. In such an embodiment, the processor 102 may have already temporarily stored the value 118, and the keys 116 and 116a in the system memory 104 or the processor 102's registers (not shown).

In the illustrated embodiment, the multi-association command 114 may be received by the host interface layer or circuit 120 of the NVMD 106. In such an embodiment, the host interface layer 120 may be configured to interact with or provide an interface for interaction between the NVMD 106 and the portion of the system 100 (e.g., processor 102) external to the NVMD 106.

In such an embodiment, the host interface layer or circuit 120 may include a key-value command processor 122, a key-value direct-memory-access (DMA) engine 124, and a key-value buffer manager 126. In various embodiments, key-value command processor 122 may be configured to receive key-value commands 114, process them, and respond to the commands 114 as needed (e.g., with data, with a response message, etc.). In some embodiments, the key-value DMA engine 124 may be configured to coordinate any direct access requests imposed upon the KV descriptors or database. The key-value buffer manager 126 may be configured to manage the buffering or temporary storage of data provided or requested by the KV command 114.

In the illustrated embodiment, the NVMD 106 may include a flash translation layer (FTL) or object translation layer 130. In various embodiments, the FTL 130 may be configured to translate the way memory access commands are structured by the processor 102, to the way data is stored by the NVMD 106. For example, the FTL 130 may be configured to: write updated data to a new empty memory page and then divert all subsequent read requests to its new address; ensure that newly-programmed pages are evenly distributed across all of the available non-volatile memory cells 140 so that they wears as evenly as possible; and keep a list of old invalid pages so that they can all be recycled at a later time.

In the illustrated embodiment, the FTL 130 may include an object mapping circuit 132. In this context the term "object" refers to a data structure as known to those skilled in the art of computer science. In various embodiments, the object mapping circuit 132 may be configured to maintain a key-value index 138, as described below. The FTL 130 may include a garbage collector 134 configured to perform automatic memory management and reclaim or reorganize unused space (i.e. garbage) within the non-volatile memory cells 140. The FTL 130 may include a wear leveler 136 configured to distribute usage of the non-volatile memory cells 140 to minimize or reduce the amount of wear or degradation experienced by the non-volatile memory cells 140 and thus extend their usable lifetimes.

As mentioned above, in the illustrated embodiment, the NVMD 106 may be configured to store and maintain a key-value index 138. This may differ from traditional systems in which the key-value index 138 is stored in the system memory 104 and maintained by the processor 102. Maintaining a traditional index may add significant overhead to such a system. In the illustrated embodiment, the key-value index 138 may be maintained by the NVMD 106, specifically by the FTL 130. In such an embodiment, this may free up a portion of the system memory 104 and processor 102 resources.

Figure 3:
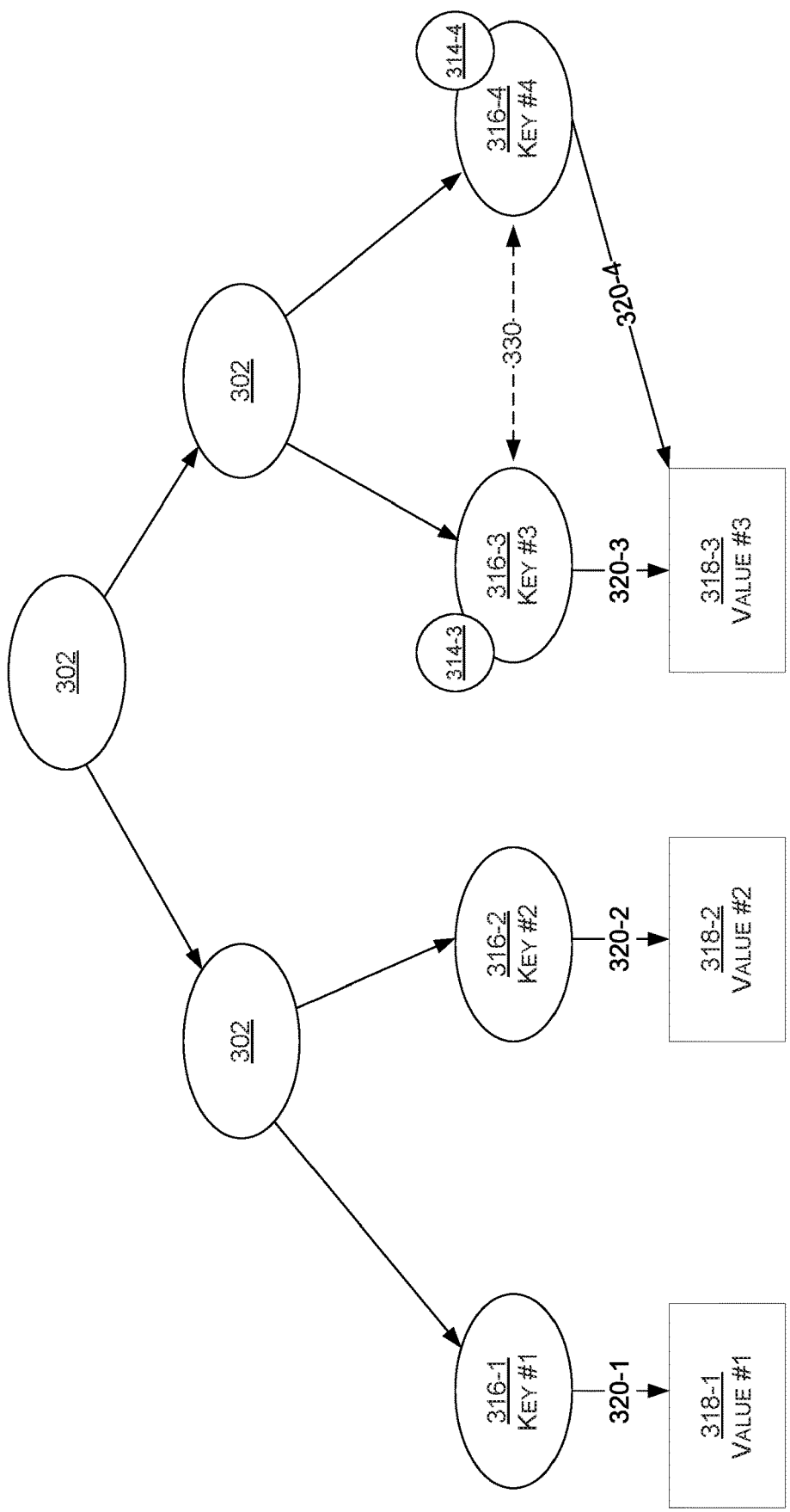
FIG. 3 is a diagram of an example embodiment of a database index in accordance with the disclosed subject matter.

As described above, the key-value index 138 may map the various keys of the key-value store (shown as KV descriptors 142) to their respective values. One example embodiment is illustrated in FIG. 3, and described below. Traditionally, the key-value index 138 includes the one-to-one associations between the keys and their respective values. In various embodiments, the KV index 138 may include a hash or binary tree of the keys. In such an embodiment, the keys (or representations thereof) may form leaf or terminal nodes at the end of the tree. The values (or representations thereof) may then be associated with those leaf nodes. The nodes representing the key-value pairs or associations may include pointers to the memory addresses or storage locations within the non-volatile memory cells 140 where the actual key-value descriptors 142 are stored.

In the illustrated embodiment, upon receiving or in response to the multi-association command 114, the FTL 130 may check through the key-value index 138 to determine if either of the two keys 116 and 116a are already included in the key-value index 138 and therefore stored by the non-volatile memory cells 140. In one embodiment, one of the two keys 116 may already exist. In such an embodiment, the FTL 130 may then associate any non-existing keys (e.g., the second key 116a) with the value 118 so that both keys 116 and 116a are associated with the same value 118.

The FTL 130 may then cause the old key-value descriptor 142 (that included only the first key 116 and the value 118) to be overwritten with a new key-value descriptor 142 (that includes both keys 116 & 116a and the common value 118). In the illustrated embodiment, the multi-association command 114 may have not indicated any particular memory address where the KV descriptor 142 is to be stored, this may be decided by the NVMD 106. The host interface 120 may, upon the storing of the KV descriptor 142, return a memory access response (e.g., an acknowledgment message) if the communications protocol employed by the embodiment dictates.

In another embodiment, the key-value index 138 may not include either or any of the keys 116 or 116a. In such an embodiment, two new leaf nodes may be created that are both associated with the common value 118. In such an embodiment, a new key-value descriptor 142 may be created that includes the two keys 116 & 116a and the value 118.

In yet another embodiment, the multi-association command 114 may include more than two keys (not shown). In such an embodiment, all of the keys may ultimately become associated with the common value 118. In various embodiments, this may mean that some keys may be disassociated with a previous value (not shown). In such an embodiment, any key-value descriptors 142 used to store these disassociated key-value pairs may be deleted or amended. It is understood that the above are merely a few illustrative examples to which the disclosed subject matter is not limited.

In some embodiments, the FTL 130 may also be configured to associate the two keys 116 and 116a with each other. In such an embodiment, NVMD 106 may be aware that the value 118 is associated with a plurality of keys. For example, if a KV command 114 to delete a key-value pair is issued against one key (e.g., key 116a), the FTL 130 may be configured to not fully delete the KV descriptor 142 that includes key 116a (and key 116 & value 118), but to modify (or overwrite it) with a new KV descriptor that includes only key 116 and value 118 (removing the deleted key 116a). It is understood that the above is merely one illustrative example to which the disclosed subject matter is not limited.

As described above, in the illustrated embodiment, the NVMD 106 may include a number of non-volatile memory cells 140 configured to store a plurality of key-value descriptors 142. In various embodiments, some of the key-value descriptors 142 may include simple key-value pairs, while others include multiple keys and a common value. In such an embodiment, the non-volatile memory cells 140 may be configured to store a common value only once regardless of how many keys are associated with the common value. That is to say a multi-associated KV descriptor may be used for a common value as opposed to creating different KV pairs for each of the associated keys.

In various embodiments, the KV command 114 may associate a permission level with a particular key 116. In such an embodiment, the permission level may dictate what memory accesses may be performed upon the value 118 using the key 116. For example a permission level may dictate that the value 118 may only be read from, and not written to or altered. Another permission level may dictate that the key may be read and altered but not deleted. In another embodiment, the permission level may dictate that a certain security level must be associated with any future KV command 114 or else the KV command 114 will fail. For example, access may be limited to a certain user, or protection ring/privilege level, etc. It is understood that the above are merely a few illustrative examples to which the disclosed subject matter is not limited.

In the illustrated embodiment, the multi-association command 114 may include a permission level to be associated with one or more of the keys 116 or 116a. In various embodiments, the same permission level may be required for all the keys 116 & 116a that are associated with the common value 118. In another embodiment, each key 116 or 116a may be associated with their own respective permission levels. It is understood that the above are merely a few illustrative examples to which the disclosed subject matter is not limited.

In the illustrated embodiment, the NVMD 106 may also include a NVMD processor 150 configured to execute instructions or commands on behalf of the NVMD 106. The NVMD 106 may also include a NVMD Buffer 152 to temporarily store data as it is processed by the NVMD 106. In some embodiments, the KV index 138 may be stored within the NVMD Buffer 152, non-volatile memory cells 140, or another memory element (not shown).

FIG. 2 is a block diagram of example embodiments of various instructions, commands, or data structures in accordance with the disclosed subject matter. In various embodiments, these key-value commands or messages may be received and acted upon by the NVMD.

In the illustrated embodiment, the command 202 illustrates a multi-association command, as described above. In one specific embodiment, the command 202 may be referred to as a CreateValueReference( ) command. The command 202 may include an opcode 212 or operation code portion that specifies the operation to be performed, in this case associate both a first key 116-1 and a second key 116-2 with the common value 118. The command 202 may also include three operands: a first or old key 116-1, a second or new key 116-2, and the common value 118. As described below, in other embodiments, different operands may be employed.

In the illustrated embodiment, the command 203 illustrates another variant of a multi-association command, as described above. In one specific embodiment, the command 203 may again be referred to as a CreateValueReference( ) command. The command 203 may include an opcode 213 or operation code portion that specifies the operation to be performed, in this case associate both an old key 116-1 and a new key 116-2 with the same common value 118, and give the second key 116-2 the indicated permission level 236-2. The command 203 may also include four operands: an old key 116-1, a new key 116-2, the permission level 236-2 to be associated with the new key 116-2, and the common value 118.

In the illustrated embodiment, the command 204 illustrates yet another variant of a multi-association command, as described above. In one specific embodiment, the command 204 may be referred to as a CreateValueReferences( ) command. The command 204 may include an opcode 214 or operation code portion that specifies the operation to be performed, in this case associate a plurality of keys with the same common value 118. The command 204 may also include a variable number of operands: the common value 118, an indication 240 of the number of keys to be associated with the common value 118, and then a key operand 116-1 to 116-n for each key.

In various embodiments, the operands illustrated above may be combined in various permutations to create a number of different multi-association commands, such as, for example, a command with permission levels for each key, a command with a permission level that is common to all keys, a command that does not include the value operand 118 but instead indicates that any new keys are to be associated with the same value as a pre-existing first key, as so on. Further, in various embodiments, the commands may not include opcodes but may instead employ dedicated signals or timings to indicate what actions are to be performed. It is understood that the above are merely a few illustrative examples to which the disclosed subject matter is not limited.

In the illustrated embodiment, the command 205 illustrates a more traditional command that may be altered to accommodate multi-associative arrays. In one specific embodiment, the command 205 may be referred to as a write, Put( ), or Set( ) command. The command 205 may include an opcode 215 or operation code portion that specifies the operation to be performed, in this case write the value 118 to the key-value descriptor associated with the key 116. The command 205 may also include two operands: a key 116 and the value 118. In various embodiments, if the value 118 is associated with multiple keys (e.g., via a previously executed multi-association command) the other, non-referenced keys may also find that their associated value 118 changed due to the command 205.

In one embodiment, the command 205 may also include a third operand, a disassociation flag 225. In such an embodiment, if this flag 225 is set, the command 205 may cause the value 118 to be disassociated with any keys but the key 116. For example, the NVMD would check if the value 118 is associated with multiple keys. If so, the NVMD may disassociate the key 116 from the common value 118, leaving the common value 118 and its other keys otherwise unchanged. The NVMD may then create a second instance of the value 118 that is only associated with the key 116. This would result in two KV descriptors, a first with the old version of value 118 and its other keys, and a second KV descriptor with the new version of value 118 (as given by the command 205) and the key 116. It is understood that the above is merely one illustrative example to which the disclosed subject matter is not limited.

In the illustrated embodiment, the command 206 illustrates a more traditional command. In one specific embodiment, the command 206 may be referred to as a read or Get( ) command. The command 206 may include an opcode 216 or operation code portion that specifies the operation to be performed, in this case read the value associated with the key 116. The command 206 may also include the operand: a key 116. In the illustrated embodiment, a value associated with multiple keys may be accessed via any one of those keys. It would not be necessary to specify every key associated with a common value to access or read the value.

In the illustrated embodiment, the command 207 illustrates a more traditional command that may be altered to accommodate multi-associative arrays. In one specific embodiment, the command 207 may be referred to as a Delete( ) command. The command 207 may include an opcode 217 or operation code portion that specifies the operation to be performed, in this case the value (or KV descriptor, et al.) associated with the key 116 is to be deleted or removed. The command 207 may also include a key 116 operand.

In various embodiments, an additional operand may be included, an all keys flag 227. In such an embodiment, if the all keys flag 227 is set any other keys associated with the key 116 (e.g., via a prior multi-association command) can also be deleted or removed. In some embodiments, if the flag 227 is not set or not present, a determination may be made if the value associated with the key 116 is associated with any other keys. If so, only the indicated key 116 may be removed, and the value and other keys may continue to be stored by the NVMD. If not, both the value and key 116 may be deleted.

FIG. 3 is a diagram of an example embodiment of a database or key-value index 300 or other data structure in accordance with the disclosed subject matter. As described above, in various embodiments, the key-value index 300 may be maintained by the NVMD or more specifically a translation layer or circuit.

As described above, the KV index 300 may include a binary tree or hash that includes a plurality of nodes 302. These nodes 302 may be traversed until a final or leaf node (e.g., node 316-1) is reached. Such a leaf node 316-1 may include a key or a pointer to a key. The leaf node 316-1 may also include or be linked with a pointer 318-1 to whatever value is associated with the key.

In the illustrated embodiment, a key #1 is represented by leaf node 316-1. The key #1 is associated (as illustrated by arrow 320-1) with the value #1 (via pointer 318-1). Likewise, a key #2 is represented by leaf node 316-2. The key #2 is associated (as illustrated by arrow 320-2) with the value #2 (via pointer 318-2). In such an embodiment, the traditional key-value pair associative relationship is shown.

In the illustrated embodiment, a key #3 is represented by leaf node 316-3. The key #3 is associated (as illustrated by arrow 320-3) with the value #3 (via pointer 318-3). Again, a key #4 is represented by leaf node 316-4. In this instance however, the key #4 is not associated with its own value, but with the value #3 (as illustrated by arrow 320-4). The value #3 is associated with multiple keys (keys #3 and #4). In such an embodiment, a plurality of keys may be associated with a single or common value, as described above.

Further, in the illustrated embodiment, the keys #3 and #4 may be associated with each other (as illustrated by arrow 330). In such an embodiment, the NVMD may be configured to adjust its behavior based upon the multi-associative nature (or lack thereof) of the value #3. For example, when writing to, or deleting a key, the NVMD may be configured to perform various actions related to the other key(s) and its association, as described above.

In the illustrated embodiment, the keys may also be associated with respective permission levels. The permissions levels associated with keys #3 and #4 are illustrated as permission levels 314-3 and 314-4, respectively. As described above, these permission levels 314-3 and 314-4 may differ for each key in the multi-associative arrangement. In another embodiment, all mutually associative keys (e.g., keys #3 & #4) may share a common permission level. In such an embodiment, a first or prime key may be indicated and only that leaf node 316-3 may include the permission level (e.g., level 314-3). It is understood that the above is merely one illustrative example to which the disclosed subject matter is not limited.

Figure 4:
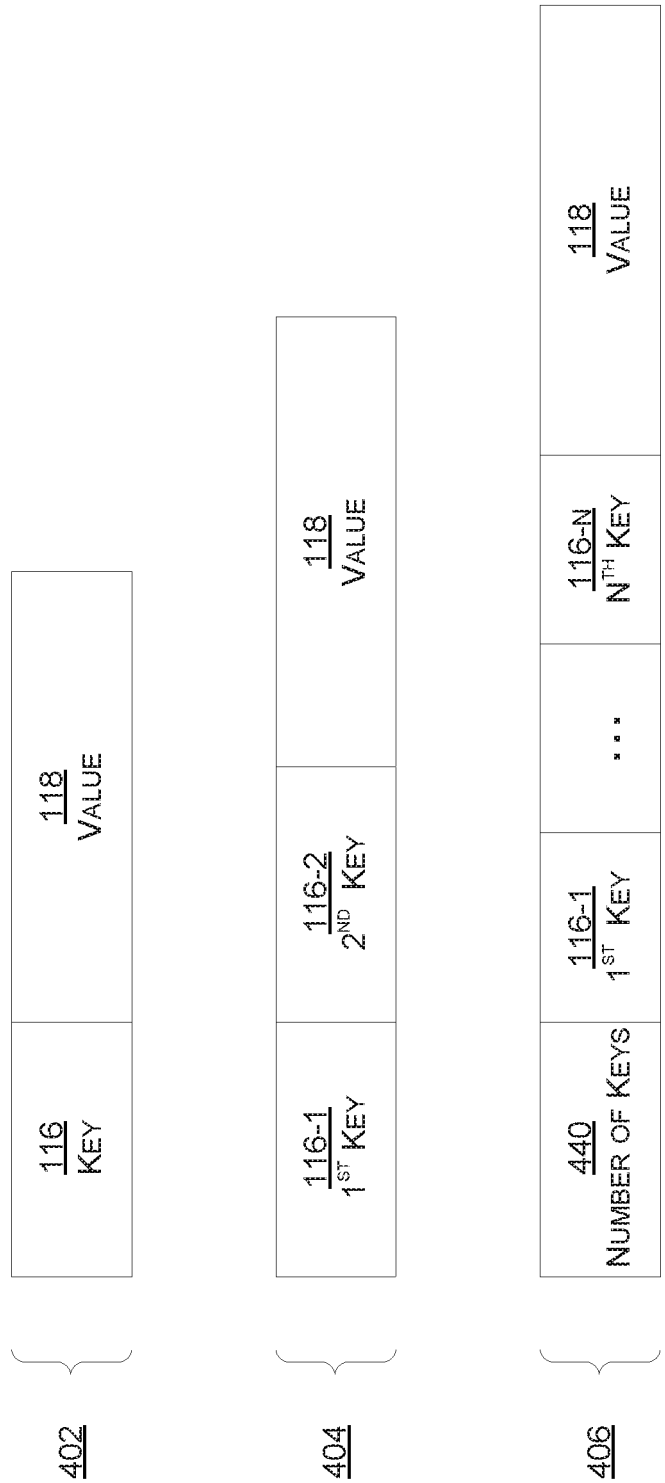
FIG. 4 is a block diagram of example embodiments of various data structures in accordance with the disclosed subject matter.

FIG. 4 is a block diagram of example embodiments of various key-value descriptors or data structures in accordance with the disclosed subject matter. In various embodiments, these key-value descriptors may be stored by the NVMD.

Key-value descriptor 402 illustrates a simple key-value pair in which a single key 116 is associated with the value 118. In systems employing the disclosed subject matter, a number of key-value descriptors may employ this simple pairing.

Key-value descriptor 404 illustrates a case in which two keys 116-1 and 116-2 are both associated with the common value 118. In such an embodiment, the NVMD may be configured to store a common value 118 only once regardless of how many keys 116-1 and 116-2 are associated with the common value 118. As such, a single key-value descriptor 404 that stores the value 118 once along with all its associated keys 116-1 and 116-2 may be employed.

Key-value descriptor 406 illustrates a case in which a plurality of keys 116-1 to 116-n are associated with the common value 118. In such an embodiment, the NVMD may be configured to store a common value 118 only once regardless of how many keys 116-1 to 116-n are associated with the common value 118. As such, a single key-value descriptor 406 that stores the value 118 once along with all its associated keys 116-1 to 116-n may be employed. As the number of keys 116 may be variable, the key-value descriptor 406 may include a field or portion 440 that indicate show many keys are associated with the common value 118.

It is understood that the above are merely a few illustrative examples to which the disclosed subject matter is not limited. In some embodiments, the permission level of each key may also be stored within the key-value descriptor. In another embodiment, the permission level may merely be stored within the key-value index and not the actual descriptors.

Figure 5:
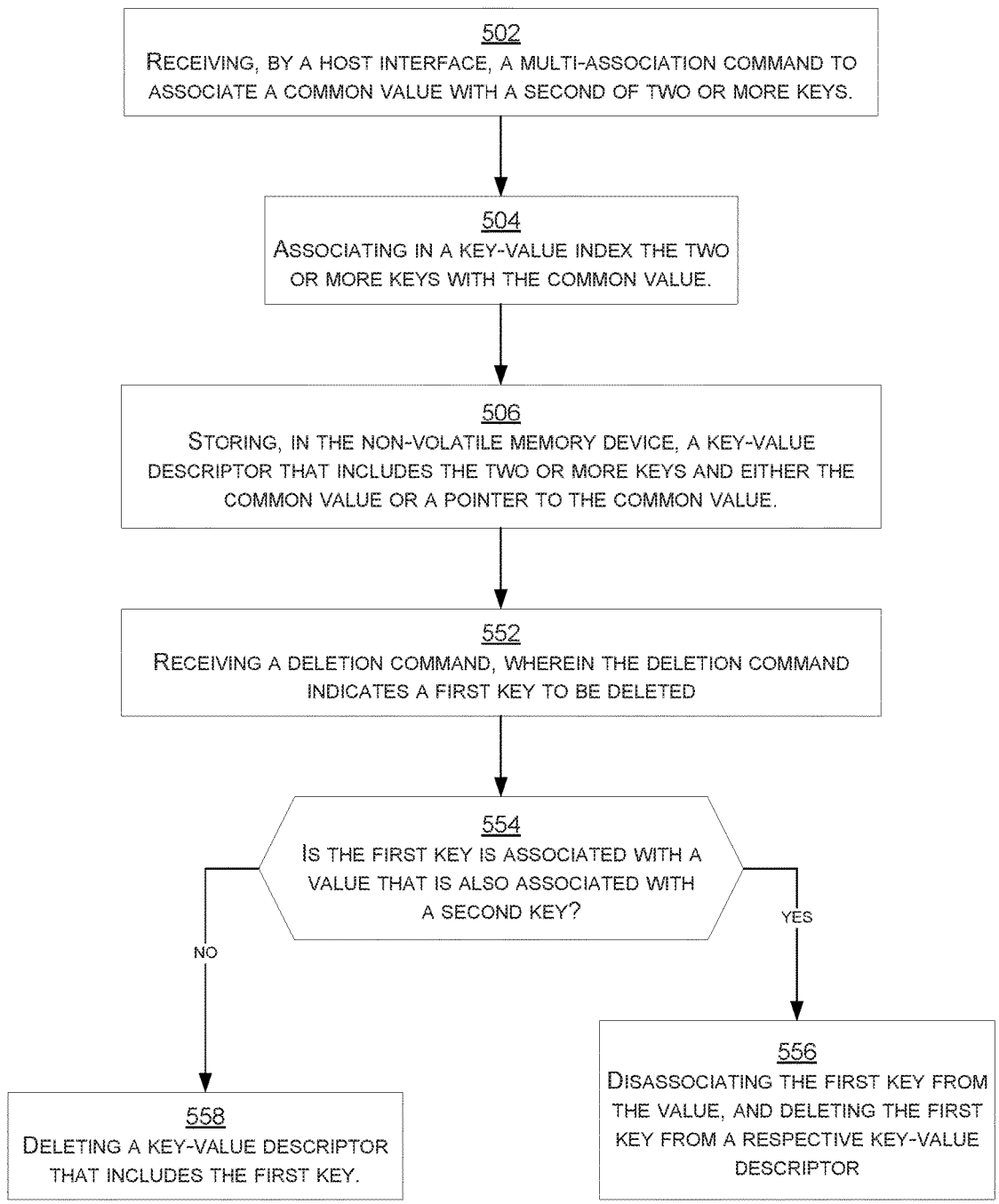
FIG. 5 is a flowchart of an example embodiment of a technique in accordance with the disclosed subject matter.

FIG. 5 is a flowchart of an example embodiment of a technique in accordance with the disclosed subject matter. In various embodiments, the technique 500 may be used or produced by the systems such as those of FIG. 1 or 6. Furthermore, portions of technique 500 may be used or produced by the data structures similar to those of FIG. 2, 3, or 4. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a multi-association command that associates a common value with a second of two or more keys may be received, as described above. In various embodiments, the command may associate the common value with two keys, as described above. In another embodiments, the command may associate a newly received second key with a common value that was previously associated with a first key. In various embodiments, one or more of the action(s) illustrated by this Block may be performed by the apparatuses or systems of FIG. 1 or 6, and/or the host interface layer 120 or non-volatile memory device (NVMD) processor 150 of FIG. 1, a circuit that connects and communicates the NVMD and external devices (e.g. the processor), a dedicated processor and/or firmware combination include by the NVDM, as described above.

Block 504 illustrates that, in one embodiment, the two or more keys may be associated in a key-value index with the common value, as described above. In various embodiments, the key-value index may be maintained by a non-volatile memory device, and represent a plurality of key-value descriptors stored within the non-volatile memory device, as described above. In some embodiments, associating may include associating the two or more keys with a single instance of the common value, as described above. In another embodiment, associating may include associating, within the key-value index, each of the two or more keys with each other, as described above. In yet another embodiment, associating may include associating a permission level with a key, wherein the permission level dictates what type of memory access may be performed with respect the respective key, as described above. In some embodiments, associating may include associating the two or more keys with different permission levels, as described above. In various embodiments, one or more of the action(s) illustrated by this Block may be performed by the apparatuses or systems of FIG. 1 or 6, and/or the transition layer or data structure, or the NVDM processor, hash table or binary tree, a data structure stored in a memory (e.g., volatile memory cells of the NVMD) included by the NVMD of FIG. 1, as described above.

Block 506 illustrates that, in one embodiment, a key-value descriptor that includes the two or more keys and either the common value or a pointer to the common value may be stored, as described above. In some embodiments, the key-value descriptor may be stored amongst the plurality of key-value descriptors, as described above. In one embodiment, storing may include storing three or more keys associated with the common value as part of one key-value descriptor, as described above. In another embodiment, storing may include storing all of the keys associated with the common value as part of one key-value descriptor, as described above. In various embodiments, one or more of the action(s) illustrated by this Block may be performed by the apparatuses or systems of FIG. 1 or 6, and/or the non-volatile memory of FIG. 1, such as NAND memory cells, as described above.

Block 552 illustrates that, in one embodiment, a deletion command may be received, as described above. In such an embodiment, the deletion command may indicate a first key to be deleted, as described above. In various embodiments, one or more of the action(s) illustrated by this Block may be performed by the apparatuses or systems of FIG. 1 or 6, and/or the host interface layer 120 or non-volatile memory device (NVMD) processor 150 of FIG. 1, a circuit that connects and communicates the NVMD and external devices (e.g. the processor), a dedicated processor and/or firmware combination include by the NVDM of FIG. 1, as described above.

Block 554 illustrates that, in one embodiment, a determination may be made as to whether the first key is associated with a value that is also associated with a second key, as described above. In various embodiments, one or more of the action(s) illustrated by this Block may be performed by the apparatuses or systems of FIG. 1 or 6, and/or the transition layer or data structure, or the NVDM processor, hash table or binary tree, a data structure stored in a memory (e.g., volatile memory cells of the NVMD) included by the NVMD of FIG. 1, as described above.

Block 556 illustrates that, in one embodiment, if the value is associated with both the first and second keys, the first key may be disassociated from the value. In such an embodiment, the first key may be deleted from a respective key-value descriptor, as described above. In various embodiments, one or more of the action(s) illustrated by this Block may be performed by the apparatuses or systems of FIG. 1 or 6, and/or the transition layer or data structure, non-volatile memory, or the NVDM processor, hash table or binary tree, a data structure stored in a memory (e.g., volatile memory cells of the NVMD) included by the NVMD of FIG. 1, as described above.

Block 558 illustrates that, in one embodiment, if the value is not associated with more than the first key, the key-vale descriptor that includes the first key may be deleted, as described above. In various embodiments, one or more of the action(s) illustrated by this Block may be performed by the apparatuses or systems of FIG. 1 or 6, and/or the non-volatile memory of FIG. 1, such as NAND memory cells, as described above.

Figure 6:
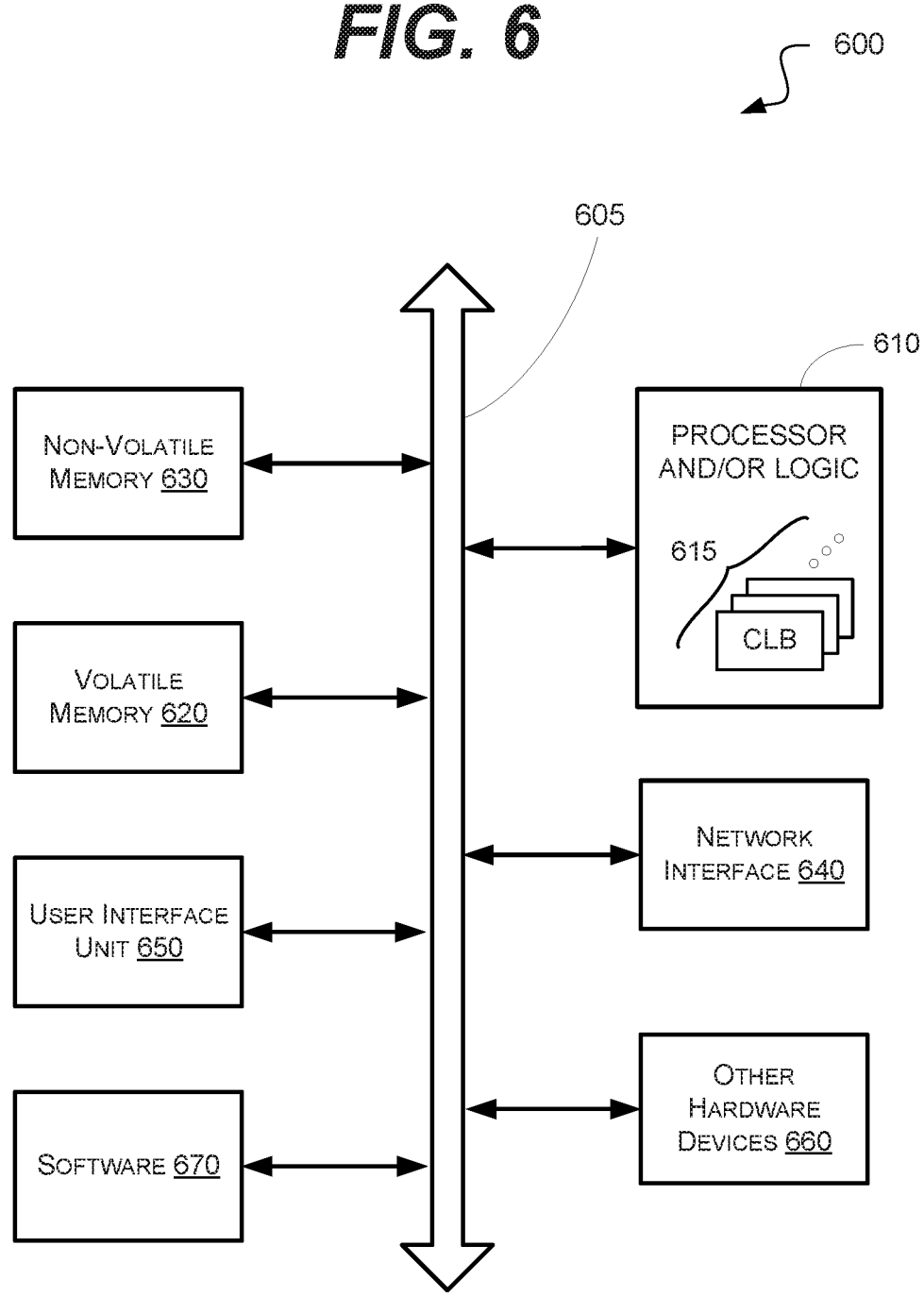
FIG. 6 is a schematic block diagram of an information processing system that may include devices formed according to principles of the disclosed subject matter.

FIG. 6 is a schematic block diagram of an information processing system 600, which may include semiconductor devices formed according to principles of the disclosed subject matter.

Referring to FIG. 6, an information processing system 600 may include one or more of devices constructed according to the principles of the disclosed subject matter. In another embodiment, the information processing system 600 may employ or execute one or more techniques according to the principles of the disclosed subject matter.

In various embodiments, the information processing system 600 may include a computing device, such as, for example, a laptop, desktop, workstation, server, blade server, personal digital assistant, smartphone, tablet, and other appropriate computers, and so on or a virtual machine or virtual computing device thereof. In various embodiments, the information processing system 600 may be used by a user (not shown).

The information processing system 600 according to the disclosed subject matter may further include a central processing unit (CPU), logic, or processor 610. In some embodiments, the processor 610 may include one or more functional unit blocks (FUBs) or combinational logic blocks (CLBs) 615. In such an embodiment, a combinational logic block may include various Boolean logic operations (e.g., NAND, NOR, NOT, XOR, and so on), stabilizing logic devices (e.g., flip-flops, latches, and so on), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 600 according to the disclosed subject matter may further include a volatile memory 620 (e.g., a Random Access Memory (RAM), and so on). The information processing system 600 according to the disclosed subject matter may further include a non-volatile memory 630 (e.g., a hard drive, an optical memory, a NAND or Flash memory, and so on). In some embodiments, either the volatile memory 620, the non-volatile memory 630, or a combination or portions thereof may be referred to as a "storage medium". In various embodiments, the volatile memory 620 and/or the non-volatile memory 630 may be configured to store data in a semi-permanent or substantially permanent form.

In various embodiments, the information processing system 600 may include one or more network interfaces 640 configured to allow the information processing system 600 to be part of and communicate via a communications network. Examples of a Wi-Fi protocol may include, but are not limited to, Institute of Electrical and Electronics Engineers (IEEE) 802.11g, IEEE 802.11n, and so on. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), and so on. Examples of a wired protocol may include, but are not limited to, IEEE 802.3 (a.k.a. Ethernet), Fibre Channel, Power Line communication (e.g., HomePlug, IEEE 1901, and so on), and so on. It is understood that the above are merely a few illustrative examples to which the disclosed subject matter is not limited.

The information processing system 600 according to the disclosed subject matter may further include a user interface unit 650 (e.g., a display adapter, a haptic interface, a human interface device, and so on). In various embodiments, this user interface unit 650 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 600 may include one or more other devices or hardware components 660 (e.g., a display or monitor, a keyboard, a mouse, a camera, a fingerprint reader, a video processor, and so on). It is understood that the above are merely a few illustrative examples to which the disclosed subject matter is not limited.

The information processing system 600 according to the disclosed subject matter may further include one or more system buses 605. In such an embodiment, the system bus 605 may be configured to communicatively couple the processor 610, the volatile memory 620, the non-volatile memory 630, the network interface 640, the user interface unit 650, and one or more hardware components 660. Data processed by the processor 610 or data inputted from outside of the non-volatile memory 630 may be stored in either the non-volatile memory 630 or the volatile memory 620.

In various embodiments, the information processing system 600 may include or execute one or more software components 670. In some embodiments, the software components 670 may include an operating system (OS) and/or an application. In some embodiments, the OS may be configured to provide one or more services to an application and manage or act as an intermediary between the application and the various hardware components (e.g., the processor 610, a network interface 640, and so on) of the information processing system 600. In such an embodiment, the information processing system 600 may include one or more native applications, which may be installed locally (e.g., within the non-volatile memory 630, and so on) and configured to be executed directly by the processor 610 and directly interact with the OS. In such an embodiment, the native applications may include pre-compiled machine executable code. In some embodiments, the native applications may include a script interpreter (e.g., C shell (csh), AppleScript, AutoHotkey, and so on) or a virtual execution machine (VM) (e.g., the Java Virtual Machine, the Microsoft Common Language Runtime, and so on) that are configured to translate source or object code into executable code which is then executed by the processor 610.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, and so on). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
a non-volatile memory device comprising:
  a host interface circuit configured to receive, from an external device, a multi-association command that associates two or more keys with a common value;
  an internal processor configured to maintain a translation layer data structure configured to:
    maintain a key-value index that represents a plurality of key-value descriptors stored within a non-volatile memory, and,
    in response to the multi-association command, associate the two or more keys with the common value; and
  the non-volatile memory configured to store a plurality of key-value descriptors each including a respective value and at least one respective key, wherein at least one key-value descriptor includes a plurality of keys, wherein each of the plurality of keys are associated with the common value, and wherein the at least one key-value descriptor further includes either the common value or a pointer to the common value.

2. The apparatus of claim 1, wherein the multi-association command includes a first key, and a second key.

3. The apparatus of claim 1, wherein the non-volatile memory is configured to store a common value a number of times less than the number of keys referencing that common value.

4. The apparatus of claim 1, wherein the translation layer is configured to:
  determine if at least one of the two or more keys exists within the key-value index; and
  insert any non-existing keys into the key-value index, such that all of the two or more keys are associated with a single instance of the common value.

5. The apparatus of claim 1, wherein the translation layer is configured to associate, within the key-value index, each of the two or more keys with each other.

6. The apparatus of claim 1, wherein the translation layer is configured to associate a permission level with each key, wherein the permission level dictates what type of memory access may be performed via a respective key.

7. The apparatus of claim 6, wherein each of the two or more keys are associated with different permission levels.

8. The apparatus of claim 1, wherein the multi-association command does not indicate where in the non-volatile memory the two or more keys and common value are to be stored.

9. The apparatus of claim 1, wherein the key-value index includes a plurality of pointers to storage locations within the non-volatile memory.

10. A method comprising:
receiving, by a host interface, a multi-association command that associates a common value with two or more keys;
associating in a key-value index the two or more keys with the common value, wherein the key-value index is maintained by a non-volatile memory device, and represents a plurality of key-value descriptors stored within the non-volatile memory device; and
storing, in the non-volatile memory device, a key-value descriptor that includes the two or more keys and either the common value or a pointer to the common value, wherein the key-value descriptor is stored amongst the plurality of key-value descriptors.

11. The method of claim 10, wherein storing comprises storing three or more keys associated with the common value as part of one key-value descriptor.

12. The method of claim 10, wherein associating includes: associating the two or more keys are associated with a single instance of the common value.

13. The method of claim 10, wherein associating includes associating, within the key-value index, each of the two or more keys with each other.

14. The method of claim 10, wherein associating includes associating a permission level with a key, wherein the permission level dictates what type of memory access may be performed with respect the respective key.

15. The method of claim 10, wherein associating includes associating the two or more keys with different permission levels.

16. The method of claim 10, further comprising:
receiving a deletion command, wherein the deletion command indicates a first key to be deleted;
determining if the first key is associated with a value that is also associated with a second key;
if so, disassociating the first key from the value, and deleting the first key from a respective key-value descriptor; and
if not, deleting a key-value descriptor that includes the first key.

17. A system comprising:
a processor configured to transmit, to a non-volatile memory device, a multi-association command that associates two or more keys with a common value; and
the non-volatile memory device configured to:
  maintain a key-value index that represents a plurality of key-value descriptors stored within the non-volatile memory device,
  in response to the multi-association command, associate the two or more keys with the common value, and
  store, in the non-volatile memory device, a key-value descriptor that includes the two or more keys and either the common value or a pointer to the common value, wherein the key-value descriptor is stored amongst the plurality of key-value descriptors.

18. The system of claim 17, wherein the non-volatile memory device comprises a translation layer configured to:
maintain the key-value index; and
insert the two or more keys into the key-value index, such that the two or more keys are associated with a single instance of the common value.

19. The system of claim 17, wherein the non-volatile memory device determines a memory address where the two or more keys and common value are to be stored.

20. The system of claim 17, wherein the key-value index includes a binary hash tree data structure.

* * * * *